(12) United States Patent
Ma et al.

(10) Patent No.: US 10,408,344 B2
(45) Date of Patent: Sep. 10, 2019

(54) OSCILLATION AMPLITUDE CONTROL COMPONENT, HOME ELECTRICAL EQUIPMENT AND OSCILLATION AMPLITUDE CONTROL METHOD AND DEVICE

(71) Applicant: Beijing Xiaomi Mobile Software Co., Ltd., Haidian District, Beijing (CN)

(72) Inventors: Ning Ma, Beijing (CN); Yizhen Yang, Beijing (CN); Zhongshuai Wang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 294 days.

(21) Appl. No.: 15/449,414

(22) Filed: Mar. 3, 2017

(65) Prior Publication Data
US 2017/0254415 A1    Sep. 7, 2017

(30) Foreign Application Priority Data
Mar. 3, 2016 (CN) .......................... 2016 1 0121182

(51) Int. Cl.
*F16H 63/06* (2006.01)
*F04D 25/10* (2006.01)
(Continued)

(52) U.S. Cl.
CPC .......... *F16H 63/065* (2013.01); *F04D 25/06* (2013.01); *F04D 25/105* (2013.01); *F16H 9/14* (2013.01);
(Continued)

(58) Field of Classification Search
CPC .......... F04D 25/105; F16H 61/66272; B60W 10/04; B60W 30/18; B60W 30/1819
(Continued)

(56) References Cited

U.S. PATENT DOCUMENTS 1,879,150 A * 9/1932 Ferguson .............. F04D 25/105
  475/11
2,794,591 A * 6/1957 Rodriguez ............ F04D 25/105
  416/110
(Continued)

FOREIGN PATENT DOCUMENTS

CN  1137822 A  12/1996
CN  1395044 A  2/2003
(Continued)

OTHER PUBLICATIONS

International Search Report in international application No. PCT/CN2016/101460, dated Jan. 13, 2017, 5 pages.
(Continued)

*Primary Examiner* — Henry Y Liu
(74) *Attorney, Agent, or Firm* — Arch & Lake LLP

(57) ABSTRACT

Described are an oscillation amplitude control component, home electrical equipment and an oscillation amplitude control method and device. The component includes: a V-shaped grooved gear, a pressure pump, a roller with a pre-formed groove and a transmission belt; the V-shaped grooved gear includes a central shaft and two frustoconical members mounted on the central shaft; lateral surfaces of two frustoconical members and the central shaft enclose a V-shaped groove; a gear is arranged on a circumference of a frustoconical member, and joined with an oscillating switch selectively; the transmission belt is configured to surround the V-shaped groove and the pre-formed groove; two frustoconical members regulate a surrounding radius of the transmission belt surrounding the V-shaped groove under control of pressure generated by the pressure pump; and the roller is fixed in an oscillating plate, and controls an oscillation amplitude of the home electrical equipment through the oscillating plate.

10 Claims, 5 Drawing Sheets

(51) Int. Cl.
  *F16H 9/14* (2006.01)
  *F16H 9/20* (2006.01)
  *F04D 25/06* (2006.01)
  *F16H 37/02* (2006.01)
  *F16H 61/00* (2006.01)
  *F16H 61/662* (2006.01)

(52) U.S. Cl.
  CPC ............ *F16H 9/20* (2013.01); *F16H 37/021* (2013.01); *F16H 61/0021* (2013.01); *F16H 61/662* (2013.01)

(58) Field of Classification Search
  USPC .............................................................. 474/8
  See application file for complete search history.

(56) References Cited

U.S. PATENT DOCUMENTS

| | | | | | |
|---|---|---|---|---|---|
| 2,829,525 | A | * | 4/1958 | Oba | F04D 25/105 416/100 |
| 4,628,773 | A | * | 12/1986 | Itoh | B60W 30/18 474/28 |
| 4,743,737 | A | * | 5/1988 | Tateishi | F24H 3/0417 165/99 |
| 5,680,672 | A | * | 10/1997 | Baumann | D04B 35/32 15/301 |
| 5,792,013 | A | * | 8/1998 | Heinrich | F16H 9/24 474/242 |
| 6,050,912 | A | * | 4/2000 | Kobayashi | F16H 61/66272 474/18 |
| 6,385,521 | B1 | * | 5/2002 | Ito | B60W 10/06 477/34 |
| 8,221,286 | B2 | * | 7/2012 | Van Der Noll | F16H 61/66272 474/62 |
| 9,115,697 | B2 | | 8/2015 | Lucas | |
| 9,586,586 | B1 | * | 3/2017 | Zhang | B60W 10/06 |
| 2004/0127320 | A1 | * | 7/2004 | Inoue | F16H 61/0021 475/210 |
| 2004/0176198 | A1 | * | 9/2004 | Nobu | F16H 61/14 474/28 |
| 2005/0197220 | A1 | * | 9/2005 | Reuschel | B60K 31/042 474/12 |
| 2007/0232423 | A1 | * | 10/2007 | Katou | F16H 61/66272 474/28 |
| 2007/0237641 | A1 | * | 10/2007 | Tsao | F04D 25/105 416/170 R |
| 2009/0026850 | A1 | * | 1/2009 | Fu | F04D 25/105 310/40.5 |
| 2011/0076144 | A1 | * | 3/2011 | Lucas | F03B 17/067 416/79 |
| 2011/0237369 | A1 | * | 9/2011 | Van Der Sluid | F16H 61/66272 474/70 |
| 2011/0237377 | A1 | * | 9/2011 | Sakanaka | F16G 5/166 474/265 |
| 2011/0250998 | A1 | * | 10/2011 | Hizuka | F16C 33/32 474/8 |
| 2012/0258825 | A1 | * | 10/2012 | Kodama | F16H 61/66272 474/69 |
| 2016/0201790 | A1 | * | 7/2016 | Shibata | F16H 9/18 474/8 |
| 2017/0130836 | A1 | * | 5/2017 | Tatangelo | F16H 61/66272 |

FOREIGN PATENT DOCUMENTS

| | | |
|---|---|---|
| CN | 2577011 Y | 10/2003 |
| CN | 1782471 A | 6/2006 |
| CN | 101839248 A | 9/2010 |
| CN | 202326321 U | 7/2012 |
| CN | 203641053 U | 6/2014 |
| CN | 104131987 A | 11/2014 |
| CN | 204283961 U | 4/2015 |
| CN | 105782091 A | 7/2016 |
| EP | 2143904 A1 | 1/2010 |
| GB | 673452 A | 6/1952 |

OTHER PUBLICATIONS

Written Opinion of the International Search Authority in international application No. PCT/CN2016/101460, dated Jan. 13, 2017, 4 pages.

English translation of International Search Report issued in corresponding International Application No. PCT/CN2016/101460, dated Jan. 13, 2017, 2 pages.

Extended European search report issued in corresponding European Application No. 16205555.2, dated Jul. 17, 2017, 7 pages.

First Office Action (including English translation) issued in corresponding Chinese Patent Application No. 201610121182.7, dated Sep. 5, 2017, 21 pages.

\* cited by examiner

OSCILLATION AMPLITUDE CONTROL COMPONENT, HOME ELECTRICAL EQUIPMENT AND OSCILLATION AMPLITUDE CONTROL METHOD AND DEVICE

CROSS-REFERENCE TO RELATED APPLICATION

This application claims priority to Chinese Patent Application serial number 201610121182.7, filed on Mar. 3, 2016, the entire contents of which are incorporated herein by reference.

TECHNICAL FIELD

The present disclosure generally relates to the field of home electrical equipment, and more particularly, to an oscillation amplitude control component, method and device.

BACKGROUND

An electric oscillating fan is one of the most common types of home electrical equipment used in daily life.

In typical oscillating fans, an oscillating plate is connected with an oscillating plate gear through a connecting rod. When a user presses an oscillating switch, the oscillating switch activates the oscillating plate gear causing the oscillating gear plate and the oscillating plate to rotate to finally cause oscillation of the electric oscillating fan.

SUMMARY

According to a first aspect of an embodiment of the present disclosure, an oscillation amplitude control component is provided, which includes: a V-shaped grooved gear, a pressure pump, a roller with a pre-formed groove and a transmission belt. The V-shaped grooved gear may include a central shaft and first and second frustoconical members slidably mounted on the central shaft; lateral surfaces of the first and second frustoconical members and the central shaft may enclose a V-shaped groove. A gear may be arranged on a circumference of at least one frustoconical member of the first and second frustoconical members, and the gear may be engaged with an oscillating switch when the oscillating switch in home electrical equipment is activated. The transmission belt may be configured to be received in the V-shaped groove of the V-shaped grooved gear and the pre-formed groove of the roller; the first and second frustoconical members may regulate an inner radius of the transmission belt received in the V-shaped groove under control of pressure generated by the pressure pump. The roller may be fixed in an oscillating plate, and may control an oscillation amplitude of the home electrical equipment through the oscillating plate.

According to a second aspect of an embodiment of the present disclosure, home electrical equipment is provided, which includes: the oscillation amplitude control component according to the first aspect.

According to a third aspect of an embodiment of the present disclosure, an oscillation amplitude control method is provided, which is adopted for home electrical equipment including an oscillation amplitude control component, the oscillation amplitude control component including a V-shaped grooved gear, a pressure pump, a roller with a pre-formed groove and a transmission belt, the transmission belt being configured to be received in a V-shaped groove of the V-shaped grooved gear and the pre-formed groove of the roller and the method including that: a regulation instruction of regulating an oscillation amplitude of the home electrical equipment is received when an oscillating switch of the home electrical equipment is activated; pressure generated by the pressure pump is regulated according to the regulation instruction; and an inner radius of the transmission belt received in the V-shaped groove is regulated according to the generated pressure, and the oscillation amplitude of the home electrical equipment is regulated through an oscillating plate for fixing the roller.

According to a fourth aspect of an embodiment of the present disclosure, an oscillation amplitude control device is provided, which is configured for home electrical equipment including an oscillation amplitude control component, the oscillation amplitude control component including a V-shaped grooved gear, a pressure pump, a roller with a pre-formed groove and a transmission belt, the transmission belt being configured to be received in a V-shaped groove of the V-shaped grooved gear and the pre-formed groove of the roller and the device including: a processor; and a memory configured to store instructions executable for the processor. The processor may be configured to: receive a regulation instruction of regulating an oscillation amplitude of the home electrical equipment when an oscillating switch of the home electrical equipment is in a pressed state; regulate pressure generated by the pressure pump according to the regulation instruction; and regulate an inner radius of the transmission belt received in the V-shaped groove according to the generated pressure, and regulate the oscillation amplitude of the home electrical equipment through an oscillating plate for fixing the roller.

According to a fifth aspect of an embodiment of the present disclosure, a non-transitory computer-readable storage medium is provided, the non-transitory computer-readable storage medium having stored therein instructions that, when executed by a processor of a device, causes the device to perform an oscillation amplitude control method adopted for home electrical equipment comprising an oscillation amplitude control component, the oscillation amplitude control component comprising a V-shaped grooved gear, a pressure pump, a roller with a pre-formed groove and a transmission belt, the transmission belt being configured to be received in a V-shaped groove of the V-shaped grooved gear and the pre-formed groove of the roller. The method comprising: receiving a regulation instruction of regulating an oscillation amplitude of the home electrical equipment when an oscillating switch of the home electrical equipment is activated; regulating pressure generated by the pressure pump according to the regulation instruction; and regulating an inner radius of the transmission belt received in the V-shaped groove according to the generated pressure, and the oscillation amplitude of the home electrical equipment is regulated through an oscillating plate for fixing the roller.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the present disclosure and, together with the specification, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with some aspects related to the present disclosure as recited in the appended claims.

Figure 1A:
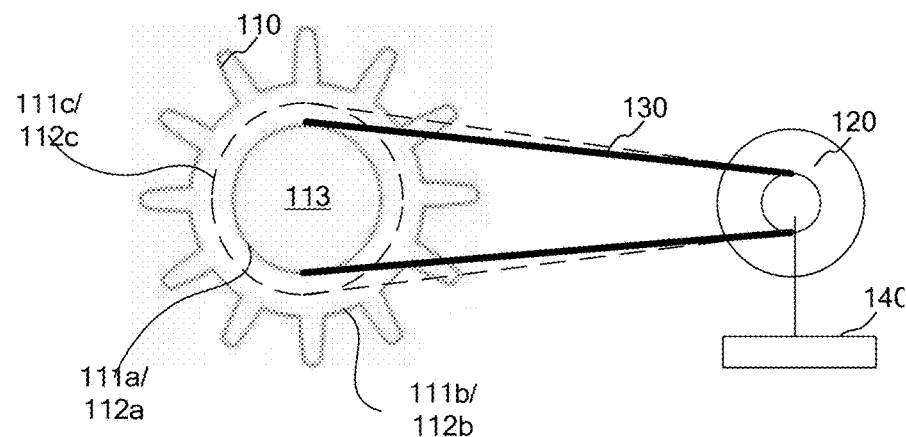
FIG. 1A is a sectional view of an oscillation amplitude control component, according to an exemplary embodiment.

FIG. 1A is a sectional view of an oscillation amplitude control component, according to an exemplary embodiment of the present disclosure. As shown in FIG. 1A, the oscillation amplitude control component includes: a V-shaped grooved gear 110, a pressure pump (not shown in the figure), a roller 120 with a pre-formed groove and a transmission belt 130.

Figure 1B:
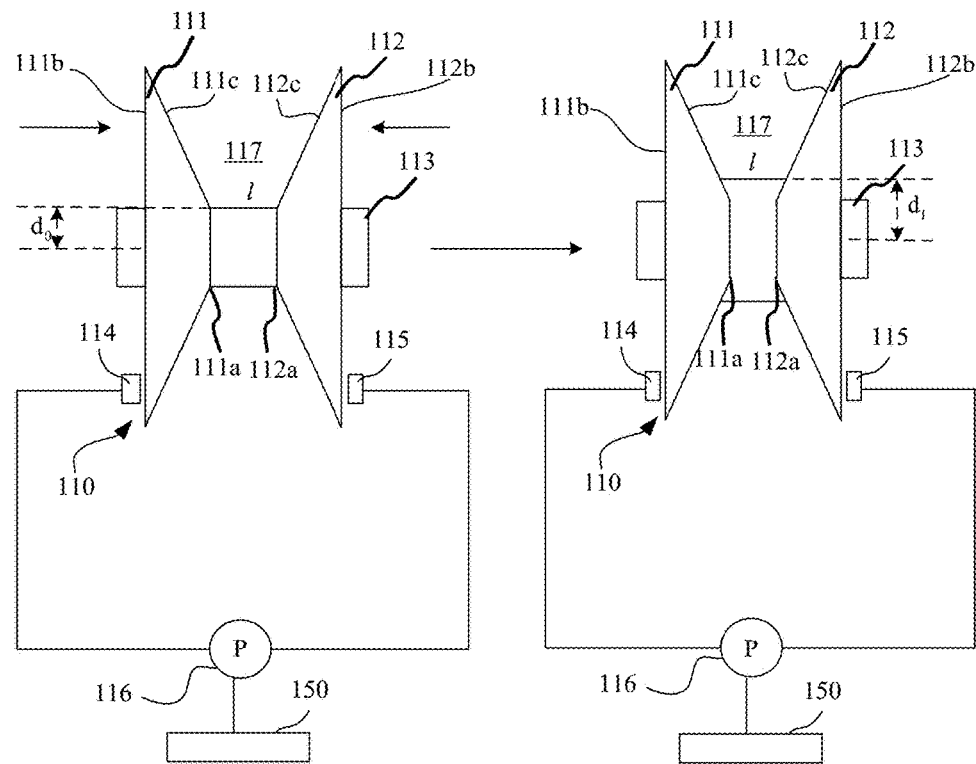
FIG. 1B is a diagram of increase of a surrounding radius of a transmission belt in case of increase of pressure, according to an exemplary embodiment.

As shown in FIG. 1B, the V-shaped grooved gear 110 includes two frustoconical members 111 and 112 and a central shaft 113, and the two frustoconical members 111 and 112 are slidably mounted on the central shaft 113, and may slide sideways, leftwards and rightwards along the central shaft 113. As shown in FIG. 1B, lateral surfaces 111c and 112c of the two frustoconical members 111 and 112 and the central shaft 113 form a V-shaped groove. The transmission belt 130 is received in the V-shaped groove and the pre-formed groove of the roller 120. During practical implementation, since the transmission belt 130 is received in the V-shaped groove, to avoid sideway sliding of the transmission belt 130 in operation, a maximum value of a distance between inner surfaces 111a and 112a of the two frustoconical members 111 and 112 is l+Δl, where l is a width of the transmission belt 130, and Δl is a preset threshold value selected based on the expected pressure output of the pump and increases with increased pressure. Moreover, when the two frustoconical members 111 and 112 slide towards the middle of the central shaft 113, the transmission belt 130 slides towards an outer side under force from the lateral surfaces of the two frustoconical members 111 and 112, and the distance between the two inner surfaces 111a and 112a gradually decreases to 0. The frustoconical members described here are parts obtained by truncating a tip of a cone by a plane parallel to and a preset distance from its base.

Figure 1C:
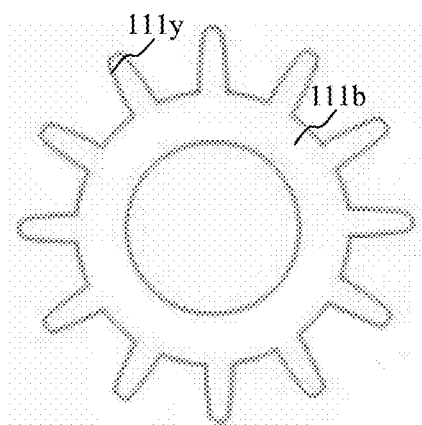
FIG. 1C is a front view of a frustoconical member with a gear, according to an exemplary embodiment.

Each of the frustoconical members 111 and 112 includes a circumference comprising an outer surface or disk 111b, 112b, and a raised gear lily is arranged on the circumference of at least one outer disk 111b, 112b. If a gear lily is arranged on a circumference of the frustoconical member 111, referring to a front view of a frustoconical member shown in FIG. 1C, the frustoconical member 111 may include a gear 111y arranged on the circumference of the outer disk 111b, wherein a size, shape and distribution of the gear lily are matched with a gear in an oscillating switch 150 in home electrical equipment. As is known in the art, the oscillating switch 150 of an electric fan controls the swing of the electric fan. The oscillating disc can include a shaft and a peripheral gear. The shaft can be connected to the axis of rotation of the fan through a connecting rod. When the gear rotates, the shaft rotates, driving the rotation of the fan shaft.

In such a manner, when the oscillating switch 150 in the home electrical equipment is activated, the V-shaped grooved gear 110 may engage the gear in the oscillating switch 150 through the gear 111y arranged on the circumference of the outer disk 111b of the frustoconical member 111, so that when the frustoconical member 111 is driven to rotate by a motor, the transmission belt 130 starts rotating by friction. The home electrical equipment mentioned in the embodiment may be equipment such as an electric oscillating fan or an electric oscillating heater.

The pressure pump 116 is configured to apply pressure to the two frustoconical members 111, 112 in the V-shaped grooved gear 110. During practical implementation, two clamping feet 114, 115 are operatively connected to the pressure pump 116, and each clamping foot 114, 115 is pressed against an outer lateral surface 111b, 112b of a frustoconical member 111, 112 in the two frustoconical members. For example, a clamping foot 114 in the two clamping feet is pressed against the outer lateral surface or disk 111b of the frustoconical member 111, and the other clamping foot 115 is pressed against the outer lateral surface or disk 112b of the frustoconical member 112. The pressure pump 116 can be a micro pressure pump under limits of a size of the electric oscillating fan, by way of example.

With reference to FIG. 1B, when the pressure generated by the pressure pump 116 increases, pressure from the two clamping feet 114, 115 pressed against the outer lateral surfaces 111b, 112b of the frustoconical members 111 and 112 increases, and the two frustoconical members 111 and 112 move inward toward the middle of the central shaft 113. Correspondingly, the transmission belt 130 received in the V-shaped groove 110 slides towards the outer side along the V-shaped lateral surfaces 111c, 112c of the two frustoconical members 111 and 112 under force from the two frustoconical members 111 and 112, so that an inner radius of the transmission belt 130 in the V-shaped groove 117 gradually increases and the two frustoconical members 111 and 112 move inwards towards the middle of the central shaft 113, increasing the inner radius of the transmission belt 130 from $d_0$ to $d_1$. (See also dotted lined in FIG. 1A.)

Figure 1D:
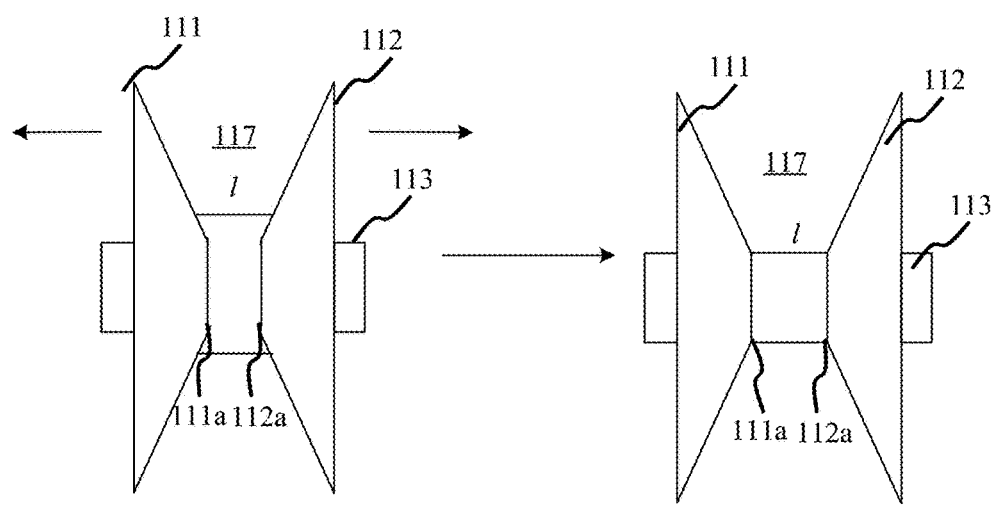
FIG. 1D is a diagram of decrease of a surrounding radius of a transmission belt in case of decrease of pressure, according to an exemplary embodiment.

On the contrary, referring to FIG. 1D, when the pressure generated by the pressure pump 116 decreases, the pressure from the two clamping feet 114, 115 pressed against the outer lateral surfaces 111b, 112b of the frustoconical members 111 and 112 decreases, and when the pressure falls below the tensile force of the transmission belt 130 on two sides, the two frustoconical members 111 and 112 may move away from each other toward opposing sides of the central shaft 113, and correspondingly, the transmission belt 130 falls back to the central shaft 113, so that the radius of the transmission belt 130 in the V-shaped groove 117 gradually decreases as the two frustoconical members 111 and 112 move away from each other to the opposing sides.

It is important to note that the frustoconical members 111 and 112 stop sliding if the tensile force of the transmission belt 130 on the two sides of the groove 117 is balanced with the pressure applied by the pressure pump 116 when the two frustoconical members 111 and 112 move inward towards the middle of the central shaft 113 or outward away from the middle of the central shaft 113 and towards the opposing sides.

In addition, it can be seen from the above analysis that a maximum value of the radius of the transmission belt 130 in the V-shaped groove 117 is a radius of the central shaft 113, and a minimum value is a radius corresponding to a position of the transmission belt 130 when the two bottom surfaces 111a and 112a of the frustoconical members 111 and 112 contact one another.

Figure 1E:
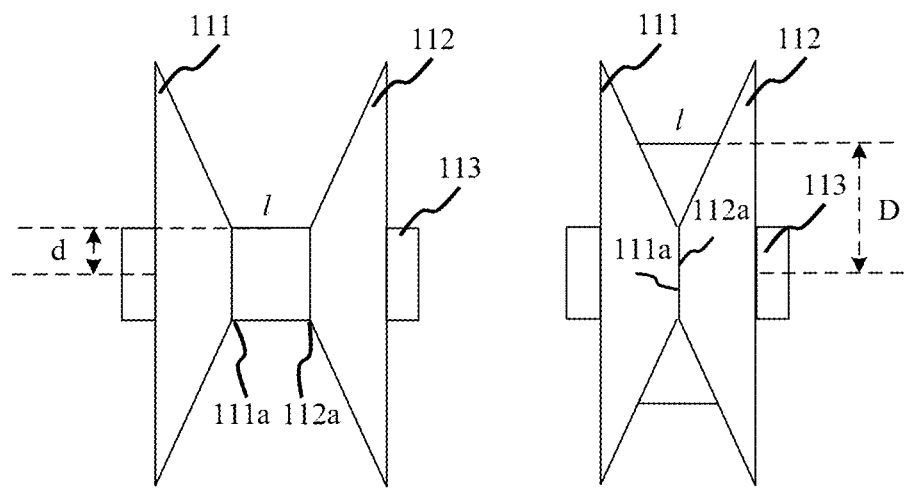
FIG. 1E is a diagram of a maximum value and a minimum value of a surrounding radius of a transmission belt, according to an exemplary embodiment.

For example, with reference to FIG. 1E, the minimum value of the inner radius is d and the maximum value is D. In the figure, l is a width of the transmission belt 130.

Optionally, if a value range is preset for the pressure generated by the pressure pump:

if the radius corresponding to the position of the transmission belt 130 when the pressure generated by the pressure pump 116 is a minimum value is greater than the radius of the central shaft 113, the minimum value of the inner radius is the radius corresponding to the position of the transmission belt 130 when the pressure is the minimum value; and similarly, if the radius corresponding to the position of the transmission belt 130 when the pressure generated by the pressure pump 116 is a maximum value is less than the radius corresponding to the position of the transmission belt 130 when the two bottom surfaces 111a and 112a of the conical members 111 and 112 contact, the maximum value of the inner radius is the radius corresponding to the position of the transmission belt 130 when the pressure is the maximum value.

Figure 1F:
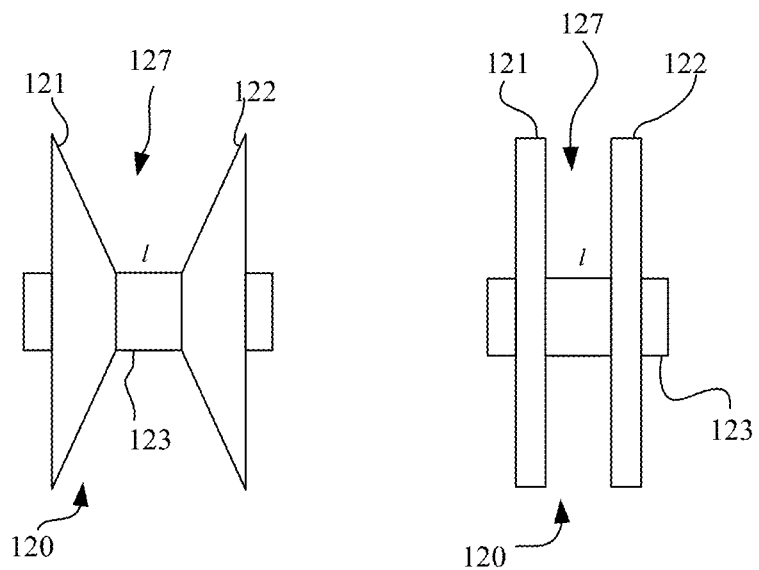
FIG. 1F is a front view of a roller with a pre-formed groove, according to an exemplary embodiment.

Referring now to FIG. 1F, the roller 120 with the pre-formed groove includes a central shaft 123 and two disks or plates 121, 122 slidably mounted on the central shaft 123, wherein the two disks or plates 121, 122 may be frustoconical members, or circular plates with predetermined heights, and may further be disks in other shapes such as elliptical disks, which will not be limited in the embodiment. The two disks or plates 121, 122 and the central shaft 123 enclose the pre-formed groove 127. Wherein, referring to FIG. 1F, when the two disks 121, 122 are frustoconical members, the pre-formed groove 127 may be a V-shaped groove shown in the left figure; while when the two disks are circular disks with predetermined heights, the pre-formed groove 127 may also be a rectangular groove as shown in the figure to the right; and the pre-formed groove 127 may also be a groove in another shape during practical implementation, and there are no limits made to the specific shape in the embodiment, wherein/is the width of the transmission belt 130.

The roller 120 with the pre-formed groove 127 is fixed in an oscillating plate 140, and after the roller 120 is driven by the transmission belt 130 to roll, the roller 120 controls an oscillation amplitude of the home electrical equipment through the oscillating plate 140.

When the pump 116 drives the frustoconical members 111, 112 toward the middle of the central shaft 113 to increase the inner radius of the transmission belt 130 in the V-shaped groove 117 of the V-shaped grooved gear 110, the oscillation amplitude of the home electrical equipment driven by the oscillating plate 140 coupled to the roller 120 is correspondingly greater after the roller 120 is driven by the transmission belt 130; and when the pump 116 drives the frustoconical members 111 and 112 toward opposing sides of the central shaft 113, decreasing the inner radius of the transmission belt 130 in the V-shaped groove 117 of the V-shaped grooved gear 110, the oscillation amplitude of the home electrical equipment driven by the oscillating plate 140 is correspondingly less after the roller 120 is driven by the transmission belt 130.

From the above, according to the oscillation amplitude control component provided in the embodiment, the V-shaped grooved gear 110 and the pressure pump 116 are arranged in the oscillation amplitude control component, the two frustoconical members 111, 112 in the V-shaped grooved gear 110 move towards the middle of the central shaft 113 to increase the inner radius of the transmission belt 130 in the V-shaped groove 117 of the V-shaped grooved gear 110 when the pressure generated by the pressure pump 116 increases, and the two frustoconical members 111, 112 in the V-shaped grooved gear 110 move away from one another to the two opposing sides of the central shaft 113 to decrease the inner radius of the transmission belt 130 surrounding the V-shaped groove 117 of the V-shaped grooved gear 110 when the pressure generated by the pressure pump 116 decreases. That is, the inner radius of the transmission belt 130 in the V-shaped groove 117 is changed, enabling each person in a multiple-person household to select a preferred oscillation level, minimizing waste as compared to prior art fixed oscillation systems.

An exemplary embodiment of the present disclosure further provides home electrical equipment, which includes an oscillation amplitude control component shown in FIG. 1A.

From the above, according to the home electrical equipment provided in the embodiment, a V-shaped grooved gear 110 and a pressure pump 116 are arranged in the oscillation amplitude control component of the home electrical equipment, two frustoconical members 111, 112 in the V-shaped grooved gear 110 move together towards the middle of the central shaft 113 to increase an inner radius of a transmission belt 130 in a V-shaped groove 117 of the V-shaped grooved gear 110 when pressure generated by a pressure pump 116 increases, and the two frustoconical members 111, 112 in the V-shaped grooved gear 110 move away from one another to two opposing sides of the central shaft 113 to decrease the inner radius of the transmission belt 130 surrounding the V-shaped groove 117 of the V-shaped grooved gear 110 when the pressure generated by the pressure pump decreases. That is, the inner radius of the transmission belt 130 in the V-shaped groove 117 is changed, facilitating use of home electrical equipment, particularly enabling regulation and adjustment of the oscillating amplitude and eliminating the problems of fixed oscillation amplitudes in home electrical equipment in the related art.

Figure 2:
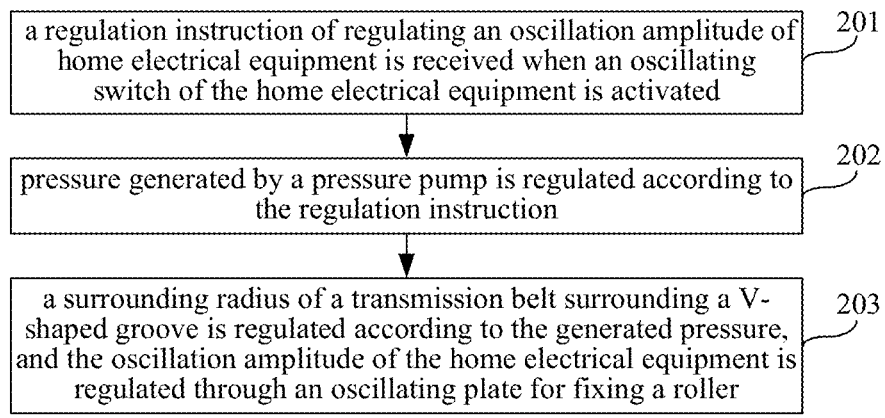
FIG. 2 is a flow chart showing an oscillation amplitude control method, according to an exemplary embodiment.

FIG. 2 is a flow chart showing an oscillation amplitude control method, according to an exemplary embodiment of the present disclosure, and the oscillation amplitude control method of the embodiment is adopted for home electrical equipment including an oscillation amplitude control component shown in FIG. 1A. As shown in FIG. 2, the oscillation amplitude control method may include:

In step 201: a regulation instruction of regulating an oscillation amplitude of the home electrical equipment is received when an oscillating switch 150 of the home electrical equipment is activated;

In step 202: pressure generated by a pressure pump 116 is regulated according to the regulation instruction; and In step 203: an inner radius of a transmission belt 130 surrounding a V-shaped groove 117 is regulated according to the generated pressure, and the oscillation amplitude of the home electrical equipment is regulated through an oscillating plate 140 for fixing a roller 120.

From the above, according to the oscillation amplitude control method provided in the embodiment, when the regulation instruction of regulating the oscillation amplitude of the home electrical equipment is received, the pressure generated by the pressure pump 116 is regulated according to the regulation instruction, and the inner radius of the transmission belt 130 in the V-shaped groove 117 is regulated according to the generated pressure, enabling each person in a multiple-person household to select a preferred oscillation level, minimizing waste as compared to prior art fixed oscillation systems.

Figure 3:
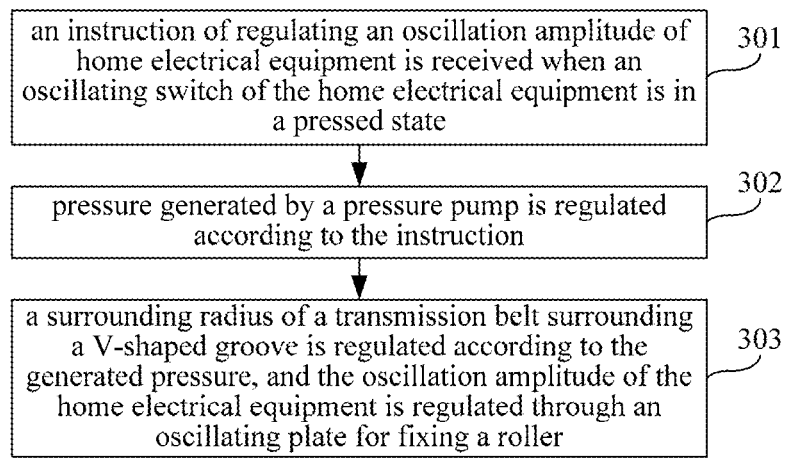
FIG. 3 is a flow chart showing an oscillation amplitude control method, according to another exemplary embodiment.

FIG. 3 is a flow chart showing an oscillation amplitude control method, according to an exemplary embodiment of the present disclosure, and the oscillation amplitude control method of the embodiment is adopted for home electrical equipment including an oscillation amplitude control component shown in FIG. 1A. As shown in FIG. 3, the oscillation amplitude control method may include the following steps.

In step 301: an instruction of regulating an oscillation amplitude of the home electrical equipment is received when an oscillating switch 150 of the home electrical equipment is in an activated state. The instruction can be provided by hardware components such as a switch or button corresponding to the home electrical equipment, or through electronic communications from a wired or wireless remote controller. Wireless communications can be provided, for example, through an infrared signal provided by a remote control device.

The home electrical equipment may be an electric oscillating fan or an electric oscillating heater, and descriptions are made with the condition that the home electrical equipment is an electric oscillating fan as an example in the embodiment.

When a user intends to oscillate the electric oscillating fan, the user may press an oscillating switch 150. Then, rotating force of a motor in the electric oscillating fan may be transmitted to a V-shaped grooved gear 110, the V-shaped grooved gear 110 transmits the rotating force to a roller 120 through a transmission belt 130, and the electric oscillating fan is finally controlled by an oscillating plate 140 for fixing the roller to start oscillating to work.

When the user intends to regulate an oscillation amplitude of the electric oscillating fan after the electric oscillating fan starts oscillating, the user may provide a signal from a hardware component, or wired or wireless communications. In a non-limiting example, a user may send an infrared instruction configured to regulate the oscillation amplitude of the electric oscillating fan to the electric oscillating fan through the remote control equipment, and correspondingly, the electric oscillating fan may receive the infrared instruction sent by the remote control equipment. Here, the electric oscillating fan may include an infrared receiving chip, and the infrared instruction sent by the remote control equipment is received through the infrared receiving chip.

For example, if there are three levels of oscillation amplitudes set in the electric oscillating fan and the electric oscillating fan currently works at level 2, when the user is intended to increase the oscillation amplitude of the electric oscillating fan, the user may select an oscillation amplitude increase button in the remote control equipment, and the remote control equipment sends an infrared instruction to the electric oscillating fan after receiving a selection signal.

It is important to note that descriptions are made only with regulation of the oscillation amplitude of the electric oscillating fan through the remote control equipment as an example in the embodiment, and optionally, a physical key configured to regulate the oscillation amplitude of the electric oscillating fan may also be preset in the electric oscillating fan, and the user regulates the oscillation amplitude of the electric oscillating fan in a manner of pressing the physical key. There are no limits made in the embodiment.

In step 302: pressure generated by a pressure pump 116 is regulated according to the instruction. As described above, the instruction can be provided in a number of ways, including through an infrared remote control.

After the electric oscillating fan receives the instruction, the electric oscillating fan may control the pressure pump to generate the pressure according to the instruction.

Optionally, the step may include that: the pressure pump is controlled to increase the generated pressure to a first preset numerical value if the regulation instruction indicates the oscillation amplitude to be increased to a first oscillation amplitude; and the pressure pump is controlled to decrease the generated pressure to a second preset numerical value if the regulation instruction indicates the oscillation amplitude to be decreased to a second oscillation amplitude.

Optionally, a corresponding relationship between different pressure values and different levels may be stored in the electric oscillating fan, and after the electric oscillating fan receives the infrared instruction, the electric oscillating fan may generate pressure corresponding to a regulated level according to the corresponding relationship, wherein a higher level corresponds to greater pressure.

For example, when an instruction to increase the oscillation amplitude is received when the electric oscillating fan is at level 2, after the electric oscillating fan receives the instruction, a pressure value such as 10N corresponding to level 3 is found according to the corresponding relationship, and pressure corresponding to the found pressure value is generated.

In step 303: an inner radius of a transmission belt 130 in a V-shaped groove 117 is regulated according to the generated pressure, and the oscillation amplitude of the home electrical equipment is regulated through an oscillating plate 140 for fixing a roller 120.

Optionally, the step may include that:

two frustoconical members 111, 112 of the V-shaped grooved gear 110 are controlled to move together towards the middle of the central shaft 113 to increase the inner radius of the transmission belt 130 surrounding the V-shaped groove 110 when the generated pressure increases, wherein the two frustoconical members 111, 112 of the V-shaped grooved gear 110 may move inwards towards the middle of the central shaft 113 under force from two clamping feet 114, 115 connected with the pressure pump 116 if the pressure generated by the pressure pump 116 increases, and the two frustoconical members 111, 112 may stop when tensile force of the transmission belt 130 is balanced with the pressure applied by the pressure pump 116 through the clamping feet 114, 115, wherein the transmission belt 130 may slide towards an outer side along a V-shaped lateral surface 111c, 112c of the V-shaped grooved gear 110 under force from the frustoconical members 111, 112 when the two frustoconical members 111, 112 move inward towards the middle of the central shaft 113, and then the inner radius of the transmission belt 130 surrounding the V-shaped groove 117 of the V-shaped grooved gear 110 increases; and the two frustoconical members 111, 112 are controlled to move toward opposing sides of the central shaft 113 to decrease the inner radius of the transmission belt 130 in the V-shaped groove 117 when the generated pressure decreases, wherein the two frustoconical members 111, 112 of the V-shaped grooved gear 110 may move apart toward two opposing sides of the central shaft 113 under the action of the tensile force of the transmission belt if the pressure generated by the pressure pump decreases, the transmission belt may correspondingly keep falling to a central shaft of the V-shaped grooved gear, and the inner radius of the transmission belt surrounding the V-shaped groove of the V-shaped grooved gear decreases, wherein the two frustoconical members may stop movement to the two opposing sides when the tensile force of the transmission belt i130 is balanced with the pressure applied by the pressure pump 116 in a process of moving the two frustoconical members 111, 112 away from one another to the opposing two sides.

When the transmission belt 130 drives the roller 120 to roll after the inner radius of the transmission belt 130 in the V-shaped groove 117 of the V-shaped grooved gear 117 changes, the oscillation amplitude of the electric oscillating fan driven by the oscillating plate 140 for fixing the roller 120 may correspondingly change. For example, the oscillation amplitude of the electric oscillating fan may increase when the inner radius of the transmission belt 130 in the V-shaped grooved gear 110 increases, and the oscillation amplitude of the electric oscillating fan may correspondingly decrease when the inner radius of the transmission belt 130 in the V-shaped grooved gear 110 decreases, which will not be elaborated in the embodiment.

From the above, according to the oscillation amplitude control method provided in the embodiment, when the regulation instruction of regulating the oscillation amplitude of the home electrical equipment is received, the pressure generated by the pressure pump 116 is regulated according to the regulation instruction, and the inner radius of the transmission belt 130 in the V-shaped groove 117 is regulated according to the generated pressure, enabling each person in a multiple-person household to select a preferred oscillation level, minimizing waste as compared to prior art fixed oscillation systems.

A device embodiment of the present disclosure is described below, and may be configured to execute the method embodiment of the present disclosure. Details which are not disclosed in the device embodiment of the present disclosure refer to the method embodiment of the present disclosure.

Figure 4:
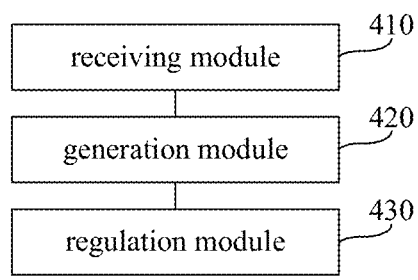
FIG. 4 is a block diagram of an oscillation amplitude control device, according to an exemplary embodiment.

FIG. 4 is a block diagram of an oscillation amplitude control device, according to an exemplary embodiment. The device may be applied to home electrical equipment including an oscillation amplitude control component shown in FIG. 1A. The device may include: a receiving module 410, a generation module 420 and a regulation module 430.

The receiving module 410 is configured to receive a regulation instruction of regulating an oscillation amplitude of the home electrical equipment when an oscillating switch 150 of the home electrical equipment is in an activated state. The generation module 420 is configured to regulate pressure generated by a pressure pump according to the regulation instruction received by the receiving module 410. The regulation module 430 is configured to regulate an inner radius of a transmission belt 130 surrounding a V-shaped groove 117 according to the pressure generated by the generation module 420, and regulate the oscillation amplitude of the home electrical equipment through an oscillating plate 140 for fixing a roller 120.

From the above, according to the oscillation amplitude control component provided in the embodiment, when the regulation instruction of regulating the oscillation amplitude of the home electrical equipment is received, the pressure generated by the pressure pump 116 is regulated according to the regulation instruction, and the surrounding radius of the transmission belt 130 in the V-shaped groove 117 is regulated according to the generated pressure, so that the problem of inapplicability of home electrical equipment with a fixed oscillation amplitude to some scenarios in the related art is solved, and the effects of regulating the oscillation amplitude of the home electrical equipment and further facilitating use are achieved.

In the embodiment, the generation module 420 is further configured to:

control the pressure pump to increase the generated pressure to a first preset numerical value if the regulation instruction indicates the oscillation amplitude to be increased to a first oscillation amplitude; and control the pressure pump to decrease the generated pressure to a second preset numerical value if the regulation instruction indicates the oscillation amplitude to be decreased to a second oscillation amplitude.

Optionally, the regulation module 430 is further configured to:

control two frustoconical members 111, 112 of the V-shaped grooved gear 110 to move inwards towards the middle of the central shaft 113 to increase the inner radius of the transmission belt 130 in the V-shaped groove 117 when the generated pressure increases; and control the two frustoconical members 111, 112 to move away from one another toward opposing sides of the central shaft 113 to decrease the inner radius of the transmission belt 130 in the V-shaped groove 117 when the generated pressure decreases.

Optionally, the receiving module 410 is further configured to:

receive an instruction, such as an infrared or other type of instruction described above, configured to regulate the oscillation amplitude of the home electrical equipment from remote control equipment.

It is important to note that the device provided in the embodiment is described with the abovementioned functional modules when controlling the oscillation amplitude as an example, and during practical application, the abovementioned functions may be allocated to different functional modules, that is, the device can be divided into different functional modules to realize all or part of the abovementioned functions.

With respect to the devices in the above embodiments, the specific manners for performing operations of individual modules therein have been described in detail in the method embodiments, which will not be elaborated herein.

An exemplary embodiment of the present disclosure further provides an oscillation amplitude control device, which may implement an oscillation amplitude control method provided in the present disclosure. The oscillation amplitude control device is configured for home electrical equipment including an oscillation amplitude control component, the oscillation amplitude control component including a V-shaped grooved gear, a pressure pump 116, a V-shaped grooved roller 120 and a transmission belt 130, the transmission belt 130 being configured to be received in a V-shaped groove 117 of the V-shaped grooved gear 110 and a second V-shaped groove 127 of the V-shaped grooved roller 120, and, referring also to FIG. 5, the oscillation amplitude control device includes: a processor 510, and a memory 504 configured to store instructions executable for the processor 510.

The processor 510 is configured to: receive a regulation instruction of regulating an oscillation amplitude of the home electrical equipment through a communication component 508 when an oscillating switch 150 of the home electrical equipment is in a pressed state; regulate pressure generated by the pressure pump according to the regulation instruction; and regulate an inner radius of the transmission belt 130 in the V-shaped groove according to the generated pressure, and regulate the oscillation amplitude of the home electrical equipment through the transmission belt and an oscillating plate 140 for fixing the V-shaped grooved roller.

As described above, FIG. 5 is a block diagram of an oscillation amplitude control device, according to an exemplary embodiment. For example, the oscillation amplitude control device 500 may be home electrical equipment such as an electric oscillating fan or an electric oscillating heater.

Figure 5:
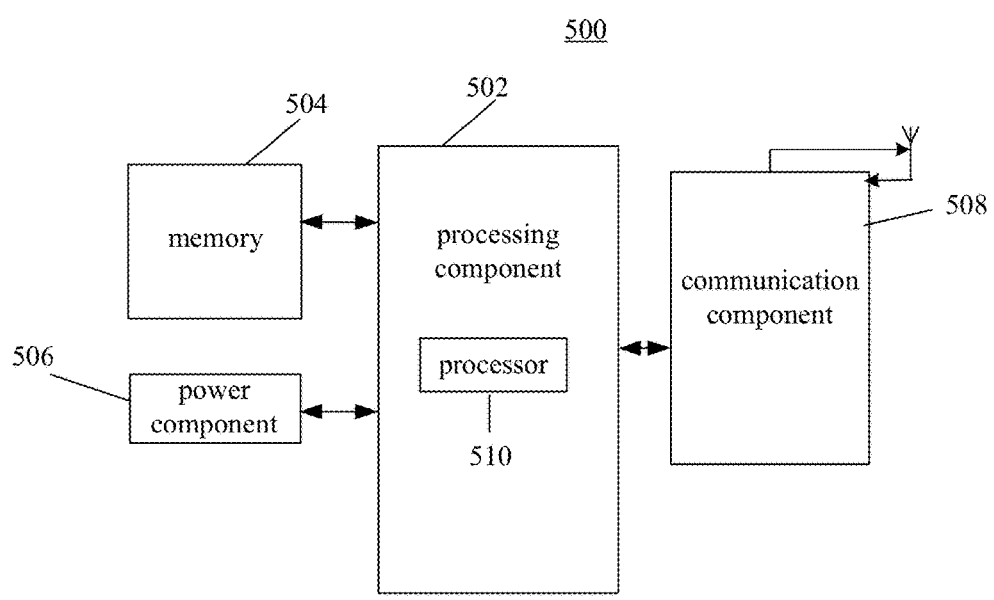
FIG. 5 is a block diagram of an oscillation amplitude control device, according to another exemplary embodiment.

Referring to FIG. 5, the device 500 may include one or more of the following components: a processing component 502, a memory 504, a power component 506 and a communication component 508.

The processing component 502 typically controls overall operations of the device 500, such as the operations associated with display, data communications, camera operations, and recording operations. The processing component 502 may include one or more processors 510 to execute instructions to perform all or part of the steps in the abovementioned method. Moreover, the processing component 502 may include one or more modules which facilitate interaction between the processing component 502 and the other components.

The memory 504 is configured to store various types of data to support the operation of the device 500. Examples of such data include instructions for any application programs or methods operated on the device 500, messages, pictures, video, etc. The memory 504 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or disk.

The power component 506 provides power for various components of the device 500. The power component 506 may include a power management system, one or more power supplies, and other components associated with the generation, management and distribution of power for the device 500.

The communication component 508 is configured to facilitate wired or wireless communication between the device 500 and another device. In an exemplary embodiment, the communication component 508 further includes a Near Field Communication (NFC) module to facilitate short-range communication. For example, the NFC module may be implemented on the basis of a Radio Frequency Identification (RFID) technology, an Infrared Data Association (IrDA) technology, an Ultra-WideBand (UWB) technology, a BlueTooth (BT) technology and another technology.

In an exemplary embodiment, the device 500 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including an instruction, such as the memory 504 including an instruction, and the instruction may be executed by the processor 510 of the device 500 to implement the abovementioned method. For example, the non-transitory computer-readable storage medium may be a ROM, a Compact Disc Read-Only Memory (CD-ROM), a magnetic tape, a floppy disc, an optical data storage device and the like.

According to a non-transitory computer-readable storage medium, when an instruction in the storage medium is executed by the processor of the device 500, the device 500 may execute the abovementioned oscillation amplitude control method.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

In the present application, a V-shaped grooved gear and a pressure pump are arranged in an oscillation amplitude control component, two frustoconical members in the V-shaped grooved gear move together towards the middle to increase an inner radius of a transmission belt surrounding a V-shaped groove of the V-shaped grooved gear when pressure generated by the pressure pump increases, and the two frustoconical members in the V-shaped grooved gear move apart to opposing sides to decrease the inner radius of the transmission belt in the V-shaped groove of the V-shaped grooved gear when the pressure generated by the pressure pump decreases, that is, the inner radius of the transmission belt in the V-shaped groove is changed, enabling each person in a multiple-person household to select a preferred oscillation level, minimizing waste as compared to prior art fixed oscillation systems.

What is claimed is:

1. An oscillation amplitude control component, comprising: a V-shaped grooved gear, a pressure pump, a roller with a pre-formed groove and a transmission belt, wherein
the V-shaped grooved gear comprises a central shaft and first and second frustoconical members slidably mounted on the central shaft; lateral surfaces of the first and second frustoconical members and the central shaft forming a V-shaped groove; a gear is arranged on a circumference of at least one frustoconical member of the first and second frustoconical members, and the gear is engaged with an oscillating switch when the oscillating switch in home electrical equipment is activated;

the transmission belt is configured to be received in the V-shaped groove of the V-shaped grooved gear and the pre-formed groove of the roller; the first and second frustoconical members regulate an inner radius of the transmission belt received in the V-shaped groove under control of pressure generated by the pressure pump; and the roller is fixed in an oscillating plate, and controls an oscillation amplitude of the home electrical equipment through the oscillating plate.

2. The oscillation amplitude control component according to claim 1, wherein the first and second frustoconical members are configured to move towards a middle to increase the inner radius of the transmission belt received in the V-shaped groove when the pressure applied by the pressure pump increases, and to move away from one another toward opposing sides to decrease the inner radius of the transmission belt received in the V-shaped groove when the pressure applied by the pressure pump decreases.

3. The oscillation amplitude control component according to claim 1, wherein first and second clamping feet are connected to the pressure pump, and each clamping foot is pressed against an outer lateral surface of a corresponding one of the frustoconical members in the two frustoconical members.

4. Home electrical equipment, comprising an oscillation amplitude control component comprising: a V-shaped grooved gear, a pressure pump, a roller with a pre-formed groove and a transmission belt, wherein the V-shaped grooved gear comprises a central shaft and first and second frustoconical members slidably mounted on the central shaft; lateral surfaces of the first and second frustoconical members and the central shaft enclose a V-shaped groove; a gear is arranged on a circumference of at least one of the first and second frustoconical member, and the gear is joined with an oscillating switch when the oscillating switch in home electrical equipment is activated;

the transmission belt is configured to be received in the V-shaped groove of the V-shaped grooved gear and the pre-formed groove of the roller; the first and second frustoconical members regulate an inner radius of the transmission belt in the V-shaped groove under control of pressure generated by the pressure pump; and the roller is fixed in an oscillating plate, and controls an oscillation amplitude of the home electrical equipment through the oscillating plate.

5. The home electrical equipment according to claim 4, wherein the first and second frustoconical members are configured to move towards a middle of the central shaft to increase the inner radius of the transmission belt surrounding the V-shaped groove when the pressure applied by the pressure pump increases, and move away from one another toward opposing sides of the central shaft to decrease the inner radius of the transmission belt surrounding the V-shaped groove when the pressure applied by the pressure pump decreases.

6. The home electrical equipment according to claim 4, wherein first and second clamping feet are connected to the pressure pump, and each clamping foot is pressed against an outer lateral surface of a corresponding one of the first and second frustoconical members.

7. An oscillation amplitude control method, adopted for home electrical equipment comprising an oscillation amplitude control component, the oscillation amplitude control component comprising a V-shaped grooved gear, a pressure pump, a roller with a pre-formed groove and a transmission belt, the transmission belt being configured to be received in a V-shaped groove of the V-shaped grooved gear and the pre-formed groove of the roller and the method comprising:

receiving a regulation instruction of regulating an oscillation amplitude of the home electrical equipment when an oscillating switch of the home electrical equipment is in an activated state;

regulating pressure generated by the pressure pump according to the regulation instruction; and regulating an inner radius of the transmission belt in the V-shaped groove according to the generated pressure, and the oscillation amplitude of the home electrical equipment is regulated through an oscillating plate for fixing the roller.

8. The method according to claim 7, wherein the step of regulating the pressure generated by the pressure pump according to the regulation instruction comprises:

controlling the pressure pump to increase the generated pressure to a first preset numerical value if the regulation instruction indicates the oscillation amplitude to be increased to a first oscillation amplitude; and controlling the pressure pump to decrease the generated pressure to a second preset numerical value if the regulation instruction indicates the oscillation amplitude to be decreased to a second oscillation amplitude.

9. The method according to claim 7, wherein the step of regulating the inner radius of the transmission belt surrounding the V-shaped groove according to the generated pressure comprises:

controlling first and second frustoconical members of the V-shaped grooved gear to move together towards a middle of the V-shaped groove to increase the inner radius of the transmission belt in the V-shaped groove when the generated pressure increases; and controlling the first and second frustoconical members to move away from one another to opposing sides of the V-shaped groove to decrease the inner radius of the transmission belt in the V-shaped groove when the generated pressure decreases.

10. The method according to claim 7, wherein the step of receiving the regulation instruction of regulating the oscillation amplitude of the home electrical equipment comprises:

receiving an infrared instruction configured to regulate the oscillation amplitude of the home electrical equipment sent from remote control equipment.

* * * * *